(12) United States Patent
Meng et al.

(10) Patent No.: US 8,341,097 B2
(45) Date of Patent: Dec. 25, 2012

(54) SYSTEMS, METHODS AND CIRCUITS FOR LEARNING OF RELATION-BASED NETWORKS

(75) Inventors: Teresa H. Meng, Saratoga, CA (US);
Wing H. Wong, Stanford, CA (US);
Narges Asadi Bani, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 457 days.

(21) Appl. No.: 12/696,317

(22) Filed: Jan. 29, 2010

(65) Prior Publication Data
US 2010/0198761 A1 Aug. 5, 2010

Related U.S. Application Data

(60) Provisional application No. 61/148,603, filed on Jan. 30, 2009.

(51) Int. Cl.
*G06F 15/18* (2006.01)
(52) U.S. Cl. ........................................ 706/12
(58) Field of Classification Search .................. 706/12
See application file for complete search history.

(56) References Cited

U.S. PATENT DOCUMENTS

| | | | |
|---|---|---|---|
| 2007/0282768 A1 | 12/2007 | Chang et al. | |
| 2008/0025614 A1 | 1/2008 | Hintz et al. | |
| 2012/0078821 A1 * | 3/2012 | Ma et al. | 706/12 |

OTHER PUBLICATIONS

BEE2 Website: http://bee2.eecs.berkeley.edu/.
W. K. Hastings, "*Monte carlo sampling methods using markov chains and their applications*," (1970).
W. Buntine, "*Theory refinement of Bayesian networks*," In Uncertainty in Artificial Intelligence, Proceedings of, pp. 52-60 (1991).
C. J. Geyer, "*Markov chain monte carlo maximum likelihood*," In Computing Science and Statistics: Proceedings of 23rd Symposium on the Interface Foundation, pp. 156-63, Fairfax Station (1991).
G. F. Cooper and E. Herskovits, "*A bayesian method for the induction of probabilistic networks from data*," Machine Learning, 9(4), pp. 309-347 (1992).
D. Heckerman, D. Geiger, and D. M. Chickering, "*Learning bayesian networks: The combination of knowledge and statistical data*," Mach. Learn., 20(3), pp. 197-243 (Sep. 1995).
D. M. Chickering, "*Learning Bayesian Networks Is NP-Complete*," In Learning from Data: Artificial Intelligence and Statistics V., Springer-Verlag, pp. 121-130 (1996).

(Continued)

*Primary Examiner* — Michael B Holmes
(74) *Attorney, Agent, or Firm* — Crawford Maunu PLLC (57) ABSTRACT

Circuits, devices and methods for processing learning networks are implemented using a variety of methods and devices. One example involves a circuit-implemented method to identify a relationship of objects in a set of objects. Local scores are generated for the object and possible parents. The local scores indicate relationship strength between object and parent. The results are stored in a memory. A state-machine circuit is used to perform sampling and searching of the parent sets for each data node. The local scores are used to encode orderings of the parent. An algorithm is executed that uses the encoded possible orderings and a random variable to generate and score a current order and a proposed order of the possible parent sets. The proposed orders are accepted or rejected based on probability rules applied to the scores for the current and proposed orders. Structures are sampled to assess a Bayesian-based relationship.

22 Claims, 8 Drawing Sheets

OTHER PUBLICATIONS

G. F. Cooper and C. Yoo, "*Causal discovery from a mixture of experimental and observational data*," UAI, pp. 116-125 (1999).

J. Friedman, "*Greedy function approximation: a gradient boosting machine*," Technical Discussion: Foundations of TreeNet™, pp. 1-34 (Feb. 24, 1999).

J. Friedman, "*Stochastic gradient boosting*," pp. 1-10 (Mar. 26, 1999).

A. Moore and W. K. Wong, "*Optimal reinsertion: A new search operator for accelerated and more accurate bayesian network structure learning*," Proceedings of the 20$^{th}$ International Conference on Machine Learning (ICML '03), pp. 552-559, Menlo Park, California, AAAI Press (Aug. 2003).

N. Friedman and D. Koller, "*Being Bayesian about Bayesian network structure: A Bayesian approach to structure discovery in Bayesian networks*," Machine Learning, 50, pp. 95-125 (2003.

M. Teyssier and D. Koller, "*Ordering-based search: A simple and effective algorithm for learning Bayesian networks*," in Proceedings of the Twenty-first Conference on Uncertainty in AI (UAI), pp. 584-590, Edinburgh, Scottland, UK (Jul. 2005).

I. Pournara, C. S. Bouganis, and G. A. Constantinides, "*Fpga-accelerated bayesian learning for reconstruction of gene regulatory networks*," IEEE, pp. 323-328 (2005).

C. Chang, J. Wawrzynek, and R.W. Brodersen, "*Bee2: a high-end reconfigurable computing system*," IEEE Design and Test of Computers, pp. 114-125 (2005).

K. Sachs, O. Perez, D. Peér, D. A. Lauffenburger, and G. P. Nolan, "*Causal protein-signaling networks derived from multiparameter single-cell data*," Science, vol. 308(5721):523-529, (2005).

Hayden Kwok-Hay So, Borph: "*An operating system for FPGA-based reconfigurable computers*," PhD dissertaion, University of California, Berkeley (2007).

Byron Ellis and Wing Hung Wong, "*Learning Causal Bayesian Network Structures From Experimental Data*," Journal of the American Statistical Association (submitted and accepted for publication) (JASA jasa v.2007/01/31 Prn:Jun. 3, 2008; 13:42).

N. Friedman, I. Nachman, and D. Peér, "*Learning bayesian network structure from massive datasets: The 'sparse candidate' algorithm*," in Proceedings of the Fifteenth Conference on Uncertainty in Artificial Intelligence, pp. 206-215.

N. Asadi, T. Meng, and W. Wong, "*Reconfigurable Computing for Learning Bayesian Networks*," Proceedings of 16$^{th}$ international ACM/SIGDA symposium on field programmable gate arrays, Monterey, CA 2008.

L. Breiman, J. Friedman, R. Olshen, and C. Stone, "*Classification and Regression Trees*," Wadsworth and Brooks, Monterey, CA (1984). (book unavailable).

J. Pearl, "*Probabilistic Reasoning in Intelligent Systems: Networks of Plausible Inference*," Morgan Kaufmann (Sep. 1988). (book unavailable).

D. Geiger and D. Heckerman, "Learning Gaussian networks," Technical Report MSR-TR-94-10, Redmond, WA (1994). (abstract only).

B. Ellis and W. Wong, "*Sampling bayesian network quickly*," In Interface (2006). (unavailable).

Bayesian Networks Repository:http://compbio.cs.huji.ac.il/Repository/ (website unavailable).

N. Asadi, I. Rish, K. Scheinberg, "*Selection of Regularization Parameter in Sparse MRF Learning: a Bayesian Approach*", NIPS Workshop on Analyzing Graphs: Theory and Applications, 2008. (unavailable).

\* cited by examiner

SYSTEMS, METHODS AND CIRCUITS FOR LEARNING OF RELATION-BASED NETWORKS

RELATED PATENT DOCUMENTS

This patent document claims the benefit, under 35 U.S.C. §119(e), of U.S. Provisional Patent Application Ser. No. 61/148,603 filed on Jan. 30, 2009, and entitled "Systems, Methods and Circuits for Learning of Relation-Based Networks;" this patent document and the Appendix filed in the underlying provisional application are fully incorporated herein by reference.

FEDERALLY-SPONSORED RESEARCH AND DEVELOPMENT

This invention was made with Government support under contract 0505732 awarded by the National Science Foundation. The U.S. Government has certain rights in this invention.

FIELD OF THE INVENTION

The present invention relates generally to systems and approaches for learning relationships and patterns within observed objects, and more particularly to learning Bayesian networks.

BACKGROUND

Bayesian networks are defined as directed acyclic graphs whose structures encode the conditional independence and causal relationship between variables (nodes/objects). Bayesian networks are a class of probabilistic models that can be used in multivariate statistical analysis. Bayesian networks have been studied intensively in the past decade to learn casual models under uncertainty and have been applied successfully to different areas of science and technology for knowledge discovery. Bioinformatics, finance, signal processing, and computer vision are a few examples. Discovering unknown Bayesian network structures from data is a challenging problem and is generally considered to be computationally infeasible, except for networks with few variables. Therefore, many methods trade exactness and correctness for faster computation. Moreover, many learning algorithms have been developed based on the Von Neumann computing paradigm and rely on General Purpose Processors (GPP) for execution, and hence are limited in performance by the inherent inefficiencies of GPPs, such as sequential execution and memory hierarchy bottleneck.

SUMMARY

Various aspects of the present invention are directed to devices, methods and systems for learning relationships between observed objects in a manner that addresses challenges including those discussed above.

According to embodiments of the present invention, a method, system or device is implemented for computations to assist in learning the relationships and patterns in a set of observed objects. Hardware circuitry and software are configured or used to implement the computations. Parallel and/or sequential implementation versions of the algorithm are used for search and sampling of structures. Two dimensional encoding of ordering between the variables is used to facilitate efficient computations and fixed point representation of values for efficient computation. This encoding can be implemented in hardware and/or software.

According to embodiments of the present invention, a circuit or circuit-implemented method is used to assist in identification of at least one pattern, or relationship, of objects in a set of objects. The circuit is configured for (and method includes) pre-processing the set of objects by operating a logic circuit to generate local scores for each object and possible parent sets of that object. The local scores are indicative of the strength of the relationship between each object and a parent set. The local scores and the possible parent sets are stored in a memory circuit that is configured and arranged to provide, for each of the data nodes, access to each of the possible parent sets and the local scores. After pre-processing the set of objects, while accessing the stored local scores and possible parent sets, a state-machine circuit is used to perform sampling and searching of the parent sets for each data node. The sampling and searching uses the local scores to encode possible orderings of the parent sets. An algorithm is executed that uses the encoded possible orderings and a random variable, for generating and scoring a current order and a proposed order of the possible parent sets, and that chooses to accept or reject the proposed orders based on a set of probability rules applied to the scores for the current and proposed orders. Sampling structures are derived from the accepted proposed orders for assessment, and a Bayesian-based relationship is indicated therefrom.

The above summary is not intended to describe each embodiment or every implementation of the present disclosure. The figures and detailed description that follow more particularly exemplify various embodiments.

BRIEF DESCRIPTION OF THE DRAWINGS

The invention may be more completely understood in consideration of the detailed description of various embodiments of the invention that follows in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The aspects of the present invention are believed to be useful for discovering relationships between nodes or objects, and the invention has been found to be particularly suited for use in arrangements and methods dealing with learning or discovering relationships defined in terms of a Bayesian network. While the present invention is not necessarily limited to such applications, various aspects of the invention may be appreciated through a discussion of various examples using this context.

Implementations of the present invention are discussed in terms of a software/hardware co-design approach to learning Bayesian networks from experimental data that is scalable to very large networks. Such implementation can be useful for improving the performance of algorithms that are traditionally developed based on the Von Neumann computing paradigm. In particular instances, improvements of more than four orders of magnitude are possible (e.g., over sequentially-based software-only implementations). Various implementations use parallelism and exploit the programmability of Field Programmable Gate Array (FPGA) systems in order to facilitate the application of Bayesian network (BN) learning techniques to large problems. These problems can include, but are not limited to, studies in molecular biology where the number of variables in the system otherwise overwhelms the implementation. Aspects of the present invention combine Markov Chain Monte Carlo (MCMC) sampling with Bayesian network learning techniques as well as supervised learning methods in a parallel and scalable design.

According to embodiments of the present invention, a method, system or device is implemented for computations to assist in learning the relationships and patterns in a set of observed objects. Hardware circuitry and software are configured or used to implement the computations. Parallel and/or sequential implementation versions of the algorithm are used for search and sampling of structures. Two dimensional encoding of ordering between the variables is used to facilitate efficient computations and fixed point representation of values for efficient computation. This encoding can be implemented in hardware and/or software.

According to embodiments of the present invention, a circuit or circuit-implemented method is used to assist in identification of at least one pattern, or relationship, of objects in a set of objects. The circuit is configured for (and method includes) pre-processing the set of objects by operating a logic circuit to generate local scores for each object and possible parent sets of that object. The local scores are indicative of the strength of the relationship between each object and a parent set. The local scores and the possible parent sets are stored in a memory circuit that is configured and arranged to provide, for each of the data nodes, access to each of the possible parent sets and the local scores. After pre-processing the set of objects, while accessing the stored local scores and possible parent sets, a state-machine circuit is used to perform sampling and searching of the parent sets for each data node.

The sampling and searching uses the local scores to encode possible orderings of the parent sets. An algorithm is executed that uses the encoded possible orderings and a random variable, for generating and scoring a current order and a proposed order of the possible parent sets, and that chooses to accept or reject the proposed orders based on a set of probability rules applied to the scores for the current and proposed orders. Sampling structures are derived from the accepted proposed orders for assessment, and a Bayesian-based relationship is indicated therefrom.

The following discussion provides details regarding mapping and customization of example designs. One such design was run on the Berkeley Emulation Engine 2 (BEE2) multi-FPGA system. Experimental results are presented on synthetic data sets generated from standard Bayesian networks as well as a real life problem in the context of systems biology. The invention, however, is not limited to this specific implementation and a variety of modifications and alternative implementations are possible.

Figure 1:
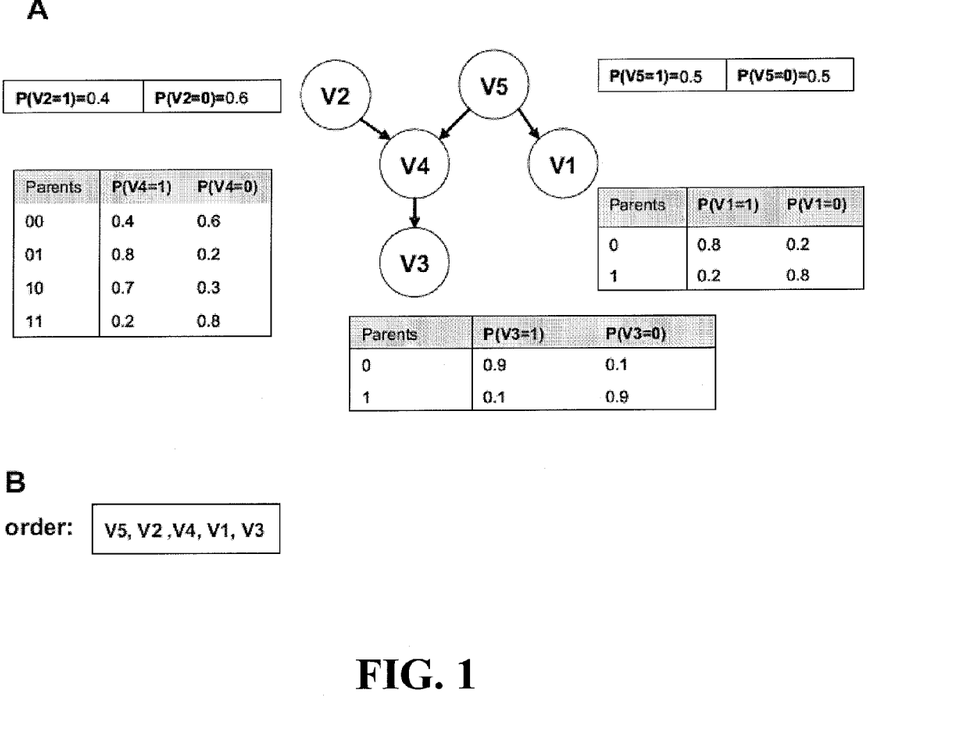
FIG. 1A depicts an example of a Bayesian network and a compatible order, consistent with an embodiment of the present invention.
FIG. 1B depicts an order encoded by an array of integers in software implementations, consistent with an embodiment of the present invention.

A Bayesian network is represented by a directed acyclic graph G and specifies the joint distribution between the variables V={V1, ..., Vn}, which are the nodes in G, by a decomposable probability $$P(V_1, \ldots, V_n) = \prod_{i=1}^{n} P(V_i \mid \Pi_i),$$

where $\Pi_i$ represents the parent set for each node and is a subset of $V \setminus V_i$. The $\Pi_i$ for each node is determined by the structure of the graph G. FIG. 1A depicts a (simple) Bayesian network. The parameters of the graph encode the local probability distributions $P(V_i \mid \Pi_i)$ and are usually chosen from the exponential family. For example, the local probabilities are assumed to have a multinomial distribution for the networks with discrete variables and Gaussian for those with continuous variables. In discrete networks each variable Vi can take values $\{v_1^i, \ldots, v^i_{|Vi|}\}$ and the local probability of each variable is defined as $$P(V_i = v_j^i \mid \Pi_i = \pi_k^i) = \theta_{ijk},$$

where $\pi_k^i$ denotes the k-th combination of values for the parent set $\Pi_i$. In Gaussian networks, each variable $V_i$ is a real random variable and the local probability is a normal distribution $$P(V_i = v^i \mid \Pi_i = \pi^i) = \mathcal{N} + \left( m_i + \sum_{V_j \in \Pi_i} b_{ij}(v^j - m_j), \sigma_i^2 \right),$$

where $m_i$ is the unconditional mean of $v_i$, by determines the strength of dependency of $v_i$ on $v_j$ and $\sigma_i^2$ is the conditional variance of node i given its parents.

One challenge in learning Bayesian networks is to find the graph structure which can best explain the data. Some methods of comparing different Bayesian graph structures are based on the Bayesian score with different priors on parameters. The Bayesian score is defined as $P(D,G)=P(G)P(D|G)$, where $P(G)$ denotes the prior on the graph structure and usually penalizes more complex structures. D denotes the experimental data. To associate casualty with network edges, the interventional data is necessary rather than just observational data, as explained by G. F. Cooper et al., *Causal discovery from a mixture of experimental and observational* data, UAI, pages 116-125, 1999, which is fully incorporated herein by reference. When the graph parameters are chosen from the exponential family with conjugate prior distribution, the Bayesian score can be expressed in closed forms. For further details on similar methods, reference can be made to, W. L. Buntine, *Theory refinement of Bayesian networks*, Uncertainty in Artificial Intelligence, 1991; D. Geiger et al., *Learning Gaussian networks*, Technical Report MSR-TR-94-10, Redmond, Wash., 1994; D. Heckerman et al., Learning bayesian networks: *The combination of knowledge and statistical data, Mach. Learn.*, 20(3):197-243, September 1995, each of which are fully incorporated herein by reference.

The number of network structures grows super-exponentially with the number of nodes as shown in Table 1 and simply finding the best score is generally NP-complete. Bayesian structure learning algorithms can be used that are based on heuristic search and optimization methods such as hill climbing and simulated annealing. Such search methods try to find a local optimum or several local optima of the distribution. For further details reference can be made to N. Friedman et al., *Learning bayesian network structure from massive datasets: The "sparse candidate" algorithm*, Proceedings of the Fifteenth Conference on Uncertainty in Artificial Intelligence, pages 206-215; A. Moore et al., *Optimal reinsertion: A new search operator for accelerated and more accurate bayesian network structure learning*, Proceedings of the 20th International Conference on Machine Learning (ICML '03), pages 552-559, Menlo Park, Calif., August 2003, AAAI Press; M. Teyssier et al., *Ordering-based search: A simple and effective algorithm for learning Bayesian networks*, In Proceedings of the Twenty-first Conference on Uncertainty in AI (UAI), pages 584-590, Edinburgh, Scotland, UK, July 2005, each of which are fully incorporated herein by reference. Sampling methods, such as MCMC, try to explore and summarize the posterior space of graph structures by performing a (random) walk in the space of possible graph structures that converges to the posterior probability P(G|D). Further details of uses of such sampling can be found in B. Ellis et al., *Sampling bayesian network quickly* and N. Friedman et al., *Being Bayesian about Bayesian network structure: A Bayesian approach to structure discovery in Bayesian networks*.

TABLE 1

Graph space grows super exponentially with the number of variables.

| Vertices | Graphs |
|---|---|
| 4 | 453 |
| 5 | 29281 |
| 10 | $4.7 \times 10^{17}$ |
| 20 | $2.34 \times 10^{72}$ |
| 30 | $2.71 \times 10^{158}$ |
| 40 | $1.12 \times 10^{276}$ |

Search methods tend to be faster in practice and hence often receive more attention than sampling methods; however, search methods are often less reliable than sampling methods especially when the posterior distribution of graph structure is multimodal. In such cases relying on a few local optima can be misleading. Another motivation to use sampling is that by learning from the posterior, a confidence level can be formed in different parts of the learned network and experiments can be designed to gather information on less confident parts of the network. This is particularly useful in sequential experiments and/or when it is expensive or impossible to observe all the variables in each data point.

Sampling in the graph space can be subject to some practical difficulties such as existence of many local optima and long mixing times (time to convergence). Order space is a possible alternative to the graph space, which can be better for sampling due to the smaller size and smoother distributions. For further details on use of order space, reference can be made to N. Friedman et al., *Being Bayesian about Bayesian network structure: A Bayesian approach to structure discovery in Bayesian networks*, Machine Learning, 50(1-2):95-125, 2003, full version of UAI 2000 paper, which is fully incorporated herein by reference. For any directed acyclic graph there exists at least one total ordering of the vertices, denoted $\prec$, such that $V_i \prec V_j$ if $V_i \in \Pi_j$. Each of these total orderings is known as a "linear extension" of the graph. An example of a Bayesian network and a compatible order is depicted in FIGS. 1A and 1B. The MCMC algorithm performs a random walk in the space of possible orders and at each step accepts or rejects the proposed order based on the current and proposed orders' posterior probabilities and the Metropolis-Hastings rule. For details on a related MCMC algorithm reference, can be made to W. K. Hastings, *Monte carlo sampling methods using markov chains and their applications*, 1970, which is fully incorporated herein by reference. The posterior probability of a given order is defined as the sum over all the graphs consistent with the order $$P(\prec \mid D) \propto \sum_{\mathcal{G} \in \prec} P(\mathcal{G} \mid D),$$

which can be efficiently calculated, $$P(\prec \mid D) \propto \sum_{\mathcal{G} \in \prec} \prod_{i=1}^{n} P(V_i, \Pi_i; D) = \prod_{i=1}^{n} \sum_{\Pi_i \in \Pi_\prec} P(V_i, \Pi_i; D). \quad (1)$$

When the MCMC chain is mixed, each order is sampled with a frequency proportional to its posterior probability. The high probable graphs are included in high probable orders, and once the orders are learned the graphs can then be extracted from the order. To sample graphs from orders one can sample parents for each node independently and in parallel. For further details on graph sampling, reference can be made to B. Ellis et al., *Sampling bayesian network quickly*, Interface, 2006, which is fully incorporated herein by reference.

An MCMC algorithm is used in the order space to find the more probable orders. Next graph structures are sampled from the learned orders by using the unbiased graph sampling algorithm discussed above. The execution time can be heavily dominated by the order sampler, and extracting the compatible graph structures can constitute only a small percentage of the execution time. Therefore, in a software/hardware co-design strategy it was possible to perform the sampling of the orders by a specialized circuitry/hardware. The learned orders are then stored in the off-chip memory. These results are read by a GPP in parallel (or at a later time) to extract the graph structures. These graph structures summarize the posterior space and can be used for Bayesian network learning tasks such as model-averaging, prediction and knowledge discovery. In case of using sequential systems such as GPPs, the graph sampler is executed after the order-sampler, however, when using a parallel system like an FPGA the graph sampler can run in parallel with the order sampler, and hence its execution time would not become the bottleneck.

In each step of the MCMC algorithm, in the order space, a proposed order is generated by applying a random change to the current state order (random walk) and then accepting or rejecting the proposed order based on the Metropolis-Hastings rule. The Metropolis-Hastings rule guarantees the chain will converge to the posterior probability as the steady state. Based on the rule the proposed order is accepted with probability $$A(\prec \rightarrow \prec') = \min\left(1, \frac{P(\prec' | D)T(\prec' \rightarrow \prec)}{P(\prec | D)T(\prec \rightarrow \prec')}\right)$$

where $T(\prec \rightarrow \prec')$ and $T(\prec' \rightarrow \prec)$ are the transition probabilities. The transition probabilities are equal in the order space and will be canceled out.

Figure 2:
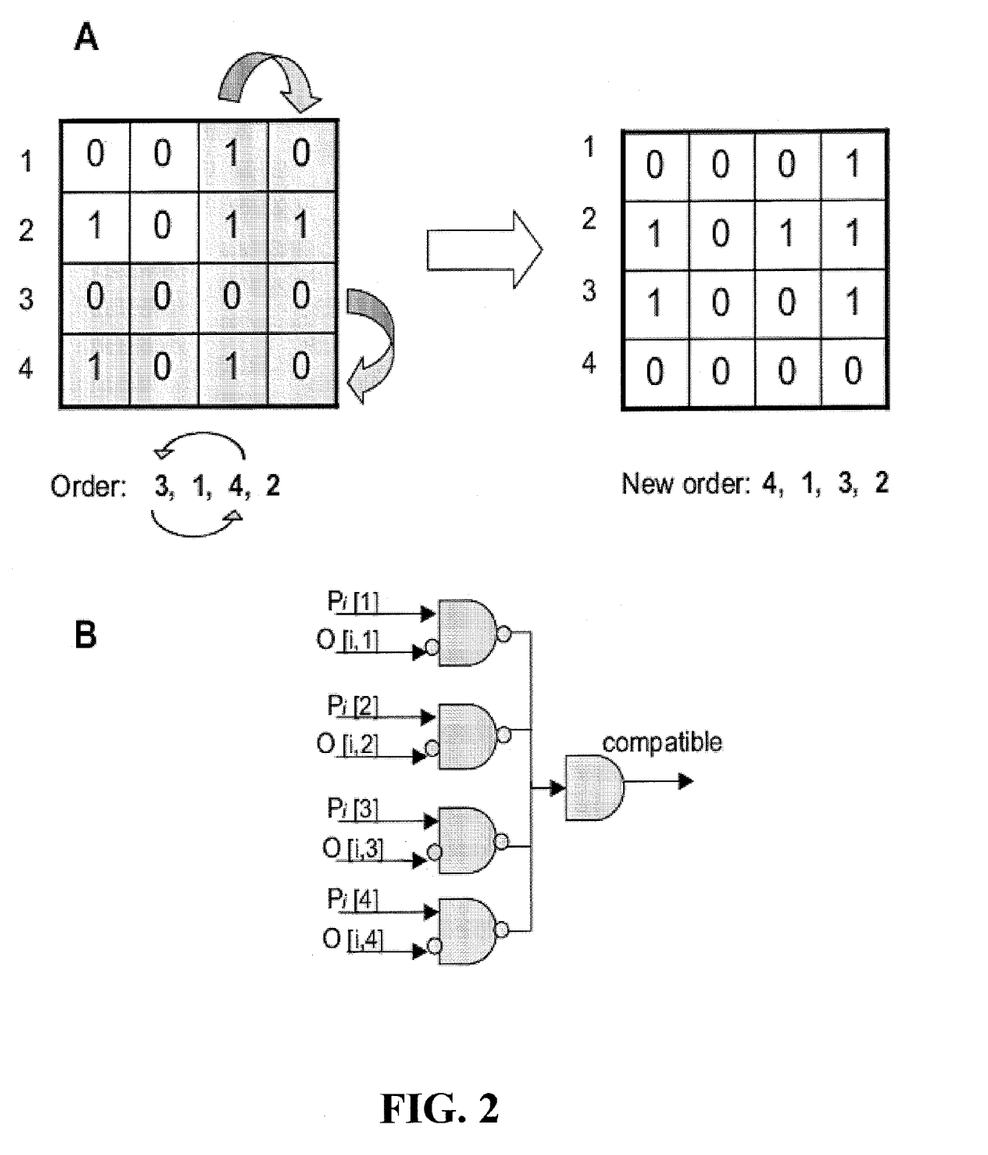
FIG. 2A depicts one-hot encoding of an order for eligible parents for the correspondent node for a network of size 4, consistent with an embodiment of the present invention.
FIG. 2B depicts a scalable two level circuitry, consistent with an embodiment of the present invention.

The sample generation and random walk can be implemented by state-machines and random number generators in hardware. A special circuit is also needed to score the orders. The score of an order given by $$P(\prec | D) \propto \prod_{i=1}^{n} \sum_{\Pi_i \in \Pi_\prec} P(V_i, \Pi_i; D),$$

which decomposes to the score of each node in the network. Hence, each node can be scored completely in parallel to the other nodes. The scoring is done by going through a database of possible parent sets and accumulating the probability of those parent sets that are compatible with the order. $P(V_i, \Pi_i; D)$ is called the local score for a node $V_i$ and a candidate parent set $\Pi_i$. The local score can be expressed in closed form. For example, for a discrete network with multinomial parameters the local score is calculated as $$P(V_i, \Pi_i; D) = \gamma^{|\Pi_i|} \prod_{k=1}^{r_i} \frac{\Gamma(\alpha_{ik})}{\Gamma(\alpha_{ik} + N_{ik})} \prod_{j=1}^{|V_i|} \frac{\Gamma(N_{ijk} + \alpha_{ijk})}{\Gamma(\alpha_{ijk})}, \quad (2)$$

where $r_i = \Pi_{V_j \in \Pi_i} |V_j|$ [7]$_1$. The hyperparameters $\gamma$ is a positive real number smaller than 1 to prefer scarcity in prior distribution of graphs. Also, $\alpha$ is the hyperparameter for BDe prior (likelihood-equivalence Bayesian Dirichlet score). The sufficient statistics, $N_{ik}$ and $N_{ijk}$, are calculated from experimental data D. Instead of recalculating the local scores for nodes each time a new parent set is assigned to them, the local score calculation is performed for all possible parent sets and nodes just once in the preprocessing steps. These local scores are stored as a distributed database on FPGA Block random-access-memories (RAMs) where each node has direct and fast access to its share of the database. While traversing the parent set database, to score an order, each node can use a circuit to decide which candidate parent sets are compatible with the order. The order is usually encoded by an array of integers in software implementations similar to the example in FIG. 1B. In the specific implementation shown, however, two dimensional one-hot encoding of order is used (e.g., for a hardware implementation), as opposed to the traditional integer-array encoding. One-hot encoding of orders can save area and time in scoring orders in hardware. In the one-hot encoding of an order, each row of the two dimensional matrix encodes the eligible parents for the correspondent node as depicted in FIG. 2A (for a network of size 4). The candidate parent sets for each node can also be encoded as bit vectors. Given these bit-level encodings, the circuitry used to decide if a parent set is compatible with an ordering can be designed using a scalable two level circuitry as shown in FIG. 2B. This circuit can be replicated to allow for parallel operations for each node. This can be particularly useful for performing the random walk and proposing new orders by the MCMC state machine. New orders can be proposed by randomly swapping two or more nodes in the ordering. For two dimensional encoding, this can be accomplished by swapping the corresponding rows and columns in the matrix as is shown in FIG. 2A.

Figure 3:
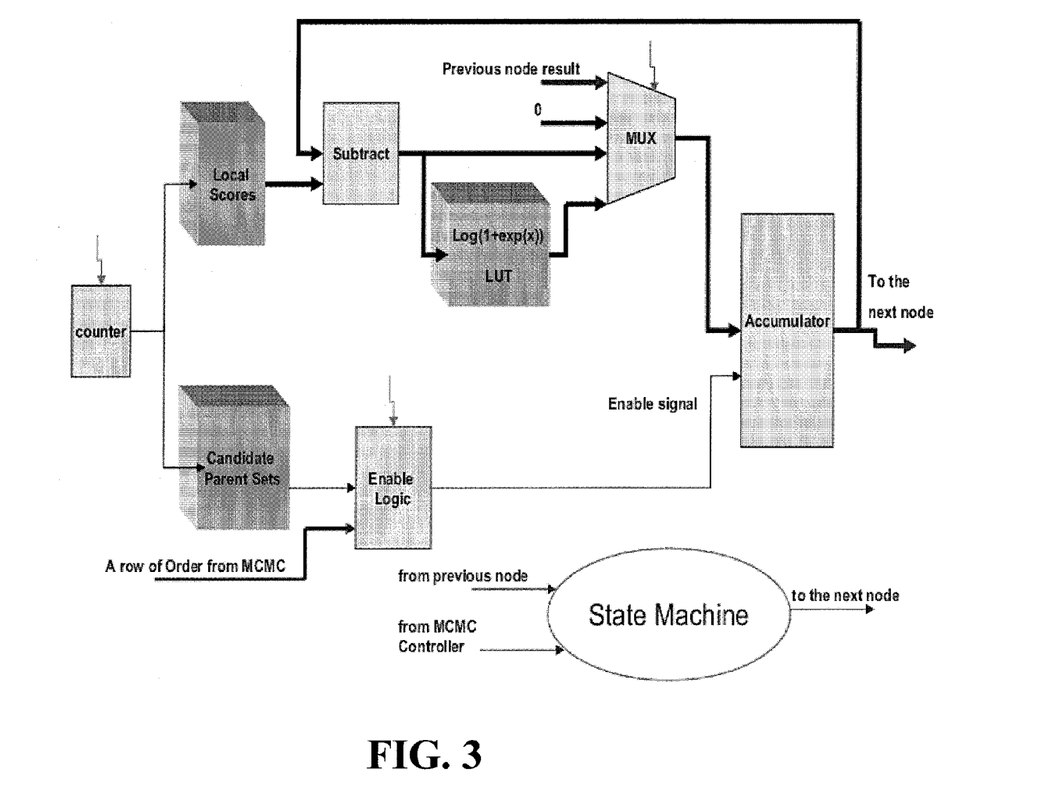
FIG. 3 depicts a block diagram of the scoring logic for one node, consistent with an embodiment of the present invention.

The candidate parent sets and the local scores are stored in the Block RAMS on the FPGA. All the computations and the stored values are in fixed point notation. As the values represent probabilities which are usually very small, it can be preferable to perform the calculations and store the values in logarithmic space. This way the multiplications are also replaced by additions and the scoring logic becomes simpler and faster. Hence, the computations needed to score an order are as follows $$\text{score}(\prec) = \sum_{i=1}^{N} \text{score}(n_i), \quad (3)$$

where $\text{score}(n_i)$ is the score of node $n_i$ given the ordering. It is computed by going through the database of the candidate parent sets and accumulating the probability of the relevant ones, $\text{score}(n_i)$ is updated many times by going through the database of the candidate parent sets for node $n_i$ $$\text{score}_{k+1}(n_i) = \\ \log(e^{\text{score}_k(n_i)} + e^{ls_{k+1}}) = \text{score}_k(n_i) + \log(1 + e^{(ls_{k+1} - \text{score}_k(n_i))}),$$

where $ls_{k+1}$ is the local score of the (k+1)'th compatible parent set in the database. $\log(1+\exp(x))$ is a function with non-linear behavior in a very small range of its input and hence can be realized with a small look-up table on FPGA. A block diagram of the scoring logic for one node is depicted in FIG. 3. Each of the computation units in the data-path was pipelined for maximum clock frequency. This scoring logic block is replicated for all the nodes in the network. The accumulators in the scoring logic circuit are also used to sum up the nodes' scores as in Equation 3. Each node passes its final result to its neighboring node and the last one sends the results back to the MCMC controller. The MCMC controller will accept the proposed order if $\log(u) < \text{score}(\prec') - \text{score}(\prec)$, where u is a uniform random variable between zero and one. The proposed order $\prec'$ is always accepted if it has a higher score than the current order $\prec$, but it also may be accepted with a lower score based on the random value $\log(u)$. This is a mechanism to escape local minima in the MCMC algorithm.

Figure 4:
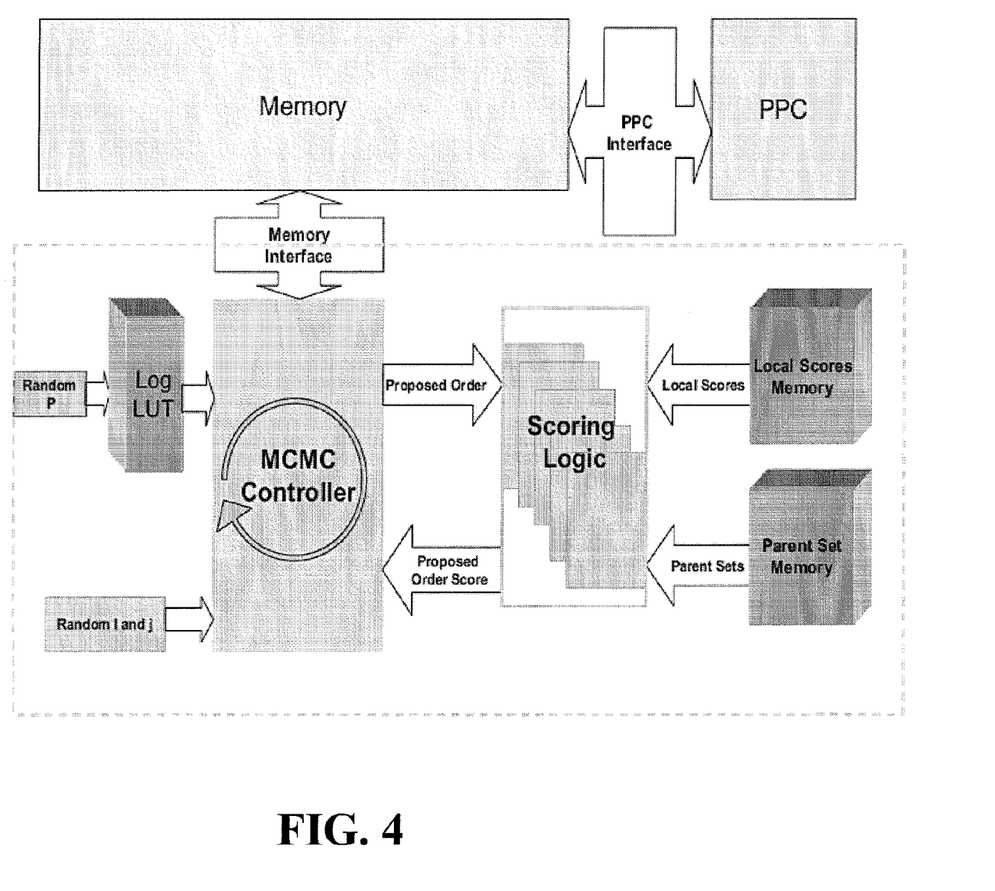
FIG. 4 depicts a block diagram of a Markov Chain Monte Carlo (MCMC) core, consistent with an embodiment of the present invention.

Leap forward Linear Feedback Shift Registers (LFSRs) can be used to generate the random numbers needed in the algorithm, such as u, or to determine the rows and columns of order that are swapped by the MCMC state machine when generating new orders. The block diagram of an MCMC core is depicted in FIG. 4.

In one implementation, an improved version of the MCMC algorithm called Parallel Tempering is used in the order space. This version can be particularly useful for adding another level of parallelism to the design as well as for improving the convergence time (mixing) of the MCMC algorithm. For further details on how to implement such an improved MCMC algorithm reference can be made to C. J. Geyer, *Markov chain monte carlo maximum likelihood*, Computing Science and Statistics: Proceedings of 23rd Symposium on the Interface Foundation, pages 156-163, Fairfax Station, 1991, which is fully incorporated herein by reference. In Parallel Tempering multiple chains of MCMC run in parallel in a temperature ladder and randomly exchange their samples according to the Metropolis-Hastings rule. The chains with higher temperatures have smoother steady-state distributions and hence explore the space more rapidly. They also feed those having a lower temperature with good scoring samples to improve their mixing (via the exchange operation). The probability distribution in temperature T is defined as $$P_T(x) = \frac{P(x)^{\frac{1}{T}}}{Z(T)},$$

where Z(T) is the normalization factor. Therefore the order score in the i'th chain is divided by $T_i$, which is the temperature in the i'th chain. The temperatures can be chosen from an exponential ladder and the division by $T_i$ can be realized using hardware shift registers. The higher temperature chains apply more aggressive changes to the order through their random walk by swapping more nodes in order per step. In every step of the MCMC algorithm each chain randomly decides to either perform a local move based on its current sample or to initiate an exchange operation with its neighbor (its left neighbor in the chain). The exchange operation between two neighboring chains i and i+1 is accepted with probability $$A_e(\prec \leftrightarrow \prec') = \min\left(1, \frac{P_{T_i}(\prec' \mid D) P_{T_{i+1}}(\prec \mid D)}{P_{T_i}(\prec \mid D) P_{T_{i+1}}(\prec' \mid D)}\right).$$

Figure 5:
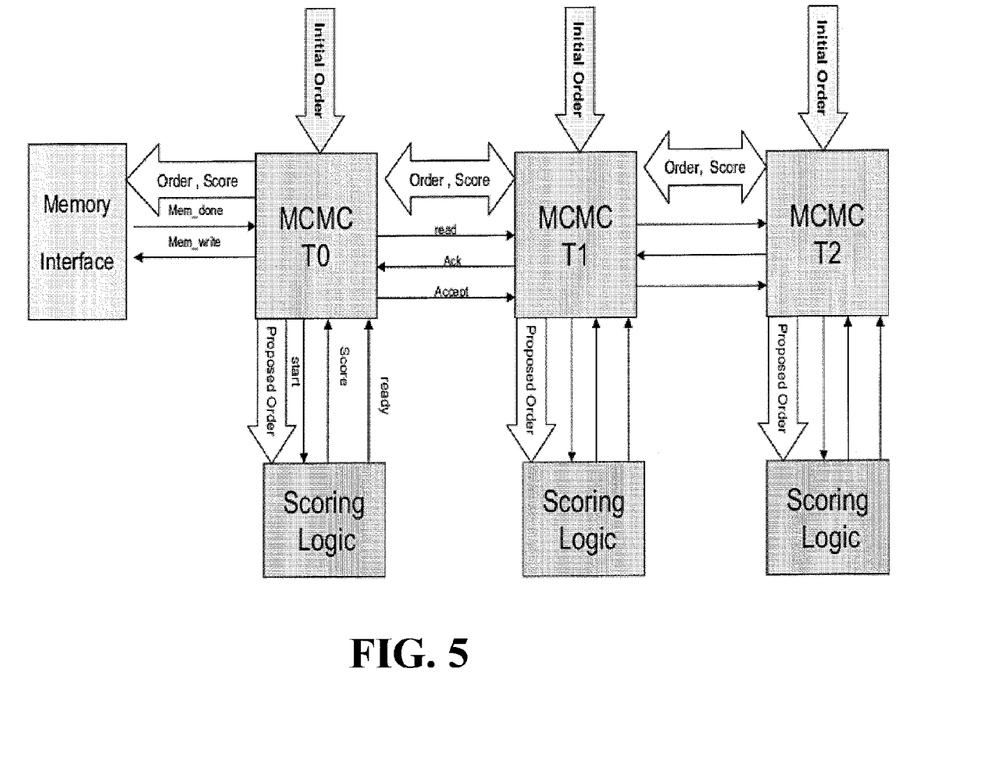
FIG. 5 depicts a block diagram of Parallel Tempering for an example implementation, consistent with an embodiment of the present invention.

Therefore the exchange operation is accepted if $$\log(u) < (T_i^{-1} - T_{i+1}^{-1})(\text{score}(\prec) - \text{score}(\prec')),$$

where u is uniformly distributed between zero and one. The MCMC chain that is sampling from the target distribution with temperature $T_0=1$, writes its samples to the memory. Parallel Tempering, as its name implies, can be realized in a parallel implementation on one or more FPGAs. FIG. 5 depicts the block diagram of Parallel Tempering for an example of such an implementation.

Aspects of the present invention are particularly suited for scaling with increased variables/network size, which can facilitate applications for learning Bayesian networks of arbitrary size. This can be particularly important because the number of scoring logic blocks grows linearly with the number of variables; however, as shown by Equation 1, the scoring circuit needs to go over many candidate parent sets for each variable to score an order in each step of the MCMC algorithm. Even if the maximum in-degree is set by some number K the number of possible parent sets is still $$\sum_{k=0}^{K} \binom{n}{k}.$$

This value grows polynomially with the size of the network. The time and space complexities soon become intractable for large K. Therefore, the order space MCMC sampler is usually run only for small K (e.g., 2 or 3); however, in practice that can be an incorrect assumption for many networks. For large networks, the local score and parent set memory are too big to store in on-chip memories, even for small values of K.

Aspects of the present invention are configured with the understanding that most of the candidate parent sets of a given node are irrelevant and have negligible local scores and hence can be ignored in scoring an order. For instance, certain embodiments of the present invention utilize algorithms that limit the MCMC search space to more promising candidate parent sets. First, the nodes' neighborhoods are discovered and then the candidate parent set database is limited for each node to subsets of its discovered neighborhood. Since the neighborhood of nodes includes their true parent sets, this method restricts the search space while relaxing the maximum in-degree assumption of the order sampler as well as decreasing its memory requirements. The algorithm for neighborhood discovery is based on supervised learning techniques similar to those used in predictive data mining. It has been observed that in predicting the value of a node its neighbors happen to have a larger weight than other variables in the network.

The problem of neighborhood discovery can be formulated as a subset selection problem in supervised learning. A supervised learning can be used to learn the local neighborhood of the variables in continuous and discrete Bayesian networks. The neighborhood discovery runs on a GPP in the preprocessing step and the resulting candidate parent sets and their local scores are loaded on FPGA Block RAMs.

For networks with discrete variables a gradient boosting method is used that is based on regression trees called Multiple Additive Regression Trees (MART). For further details on such regression trees reference can be made to J. Friedman, *Greedy function approximation: a gradient boosting machine*, 1999; J. Friedman *Stochastic gradient boosting*, 1999, which are each fully incorporated ((herein by reference. In MART, the target function is expanded in a set of basis functions $b(x; \gamma_m)$, where $\gamma_m$ is the parameter of the m-th basis function. These basis functions are called weak learners and are linearly combined with coefficients βm for prediction as $$\hat{f}(x) = \sum_{m=1}^{M} \beta_m b(x; \gamma_m),$$

where M is an arbitrary constant that is usually chosen by cross-validation methods. $\hat{f}(x)$ is fit approximately by a forward stage-wise optimization in gradient boosting. MART uses J-terminal node regression or classification trees (reference can be made to L. Breiman et al., *Classification and Regression Trees*, Wadsworthi and Brooks, Monterey, Calif., 1984, which is fully incorporated herein) as base learners, where J is usually a small number between 4 and 6. Trees have useful properties to be applied to learning the local neighborhoods in Bayesian networks. They are efficient in handling data of "mixed" type, partially observed and missing data. Trees are also robust to outliers in the input space and irrelevant inputs and most importantly they are computationally scalable.

Trees have a relevance metric that sorts the system variables according to their relative importance in prediction (e.g., as defined in L. Breiman). The relevance metric can be extended to MART by averaging the importance over the individual trees. Empirical observations revealed that the neighbors of each node have higher relative importance than the rest of the nodes. One can pick the first k important variables as a superset of the candidate parent sets, where k depends on the presumed maximum size of the neighborhood.

MART fits M trees sequentially to the data. Each tree uses nS log(S) operations where n is the number of variables and S is the number of observations. Thus MART can be reasonably run in the prepossessing step and the time it takes is negligible to the sampling process. Empirical results from several networks with hundreds of variables show that MART recovers neighborhoods successfully in large networks.

For networks with continuous variables and Gaussian local probabilities the variables' distributions depend linearly on the parent set values. A method can be implemented that is based on linear regression and backward elimination called "Backward Test" to be used in such cases. For each node Vi, linear regressions are fitted with a set $V_{-i} = \{V_1, \ldots, Vn\} \backslash V_i$ and n−1 sets $V_{-i} \backslash Vj$ for $\forall j \neq i$ as in the standard backward elimination.

F-statistics can then be obtained from each residual sum of squares (RSS) as follows $$F^{ij} = \frac{RSS^{ij}_{n-1} - RSS^{i}_n}{RSS^{i}_n/(S-n)},$$

where S is the size of the data set, n is the number of nodes, $RSS^{ij}_{n-1}$ is the RSS of the regression of $V_i$ onto $V_{-i} \backslash V_j$ and $RSS^{i}_n$ is the RSS of the regression of the node i onto $V_{-i}$. If $F^{ij}$ is larger than $F^{\alpha}_{1, S-n}$ with some predefined p-value α (e.g., 0.01) then the node j is considered in the candidate neighborhood of node i. Thus $n^2$ regressions were used to determine the candidate parent sets of all the network nodes.

Figure 6:
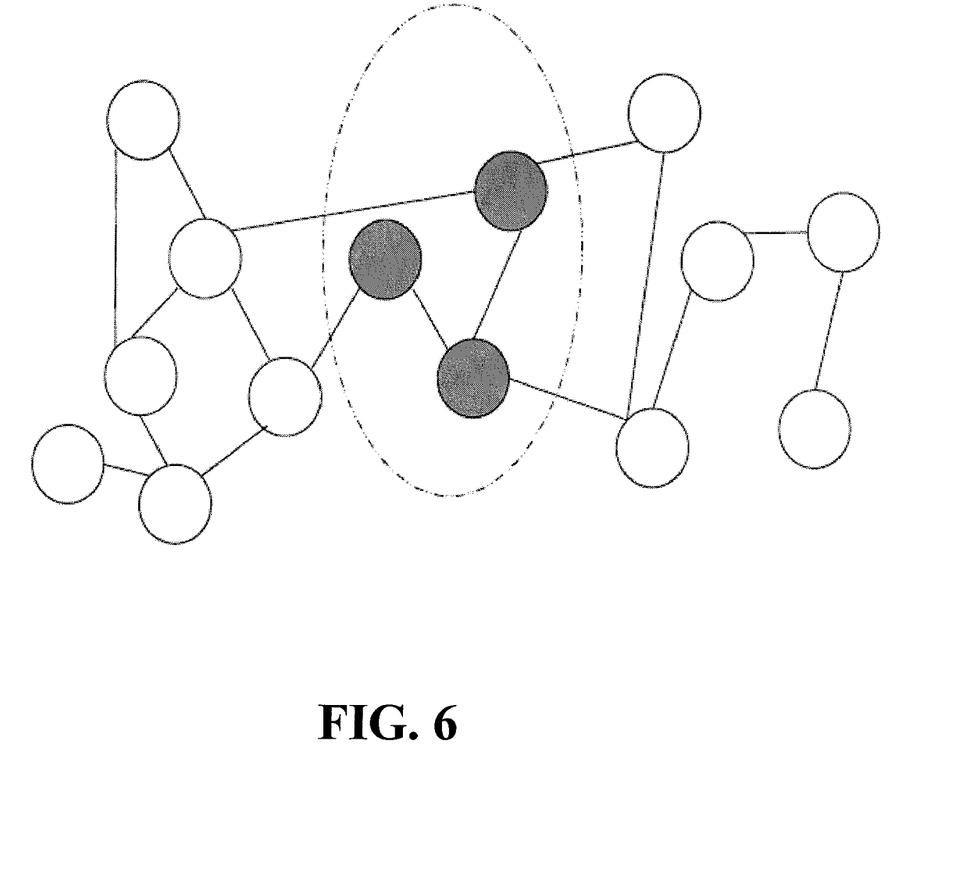
FIG. 6 depicts a graph showing decomposition of the network into several sub-networks used to reconstruct the whole network, consistent with an embodiment of the present invention.

By relying on neighborhood discovery, one can sustain a linear growth of candidate parent sets database similar to other parts of the design. Experimental results support that in this case one can fit networks of reasonable size on one FPGA chip (e.g., up to networks of 80 nodes on one Virtex II pro chip). In certain implementations a scalable approach can be used to exploit the reconfigurability of FPGAs to handle networks of arbitrary size and/or arbitrary number of candidate parent sets for each node. The supervised learning method successfully learns the local neighborhood of the nodes and provides the information on network structure or topology. More specifically, the skeleton of a network is learned, where the skeleton is an undirected graph that is constructed by adding edges between neighbor nodes. Given the network skeleton, the network can be decomposed into several sub networks, and then the divide and conquer method can be used (e.g., as described in N. Friedman et al., *Learning bayesian network structure from massive datasets: The "sparse candidate" algorithm*) to reconstruct the whole network. The graph in FIG. 6 shows an example of such cases. The grey nodes in this network separate the network into two parts. The left partition is denoted as LN, the right partition as RN and the separating nodes as SN. The subnetworks are not conducive to independent learning as the edges between the nodes in each subnetwork pose acyclicity constraint to the edges in the adjacent part. To avoid this constraint, an algorithm can be used to learn the LN and RN subnetworks for possible orderings of SN. For details on one such algorithm reference can be made to N. Friedman et al., *Learning bayesian network structure from massive datasets: The "sparse candidate" algorithm*. In this case the network can be learned separately for all the possible |SN|! orders, which reduces the size of search space from N(LN ∪ SN ∪ RN) to (|SN|!)[N(LN)+N(RN)], where N(Set) denotes the size of network space with the set of node Set.

Given a GPP that takes care of neighborhood discovery and network partitioning one can load different network partitions on FPGA by just loading new parent sets and local scores to Block RAMs. All the logic blocks and look-up tables of the design remain unchanged. This reprogramming happens infrequently as most of the time is spent in learning each of the individual subnetworks on FPGA. One can leverage the off-chip memory to fill in the Block RAMs instead of reprogramming the FPGA. This approach is facilitated because the DRAMs will be read in a sequential manner and hence perform at (or near) their peak throughput rate. DRAMs can also be used to store and stream the database of the candidate parent sets in case it does not fit on the chip BRAMs.

Figure 7:
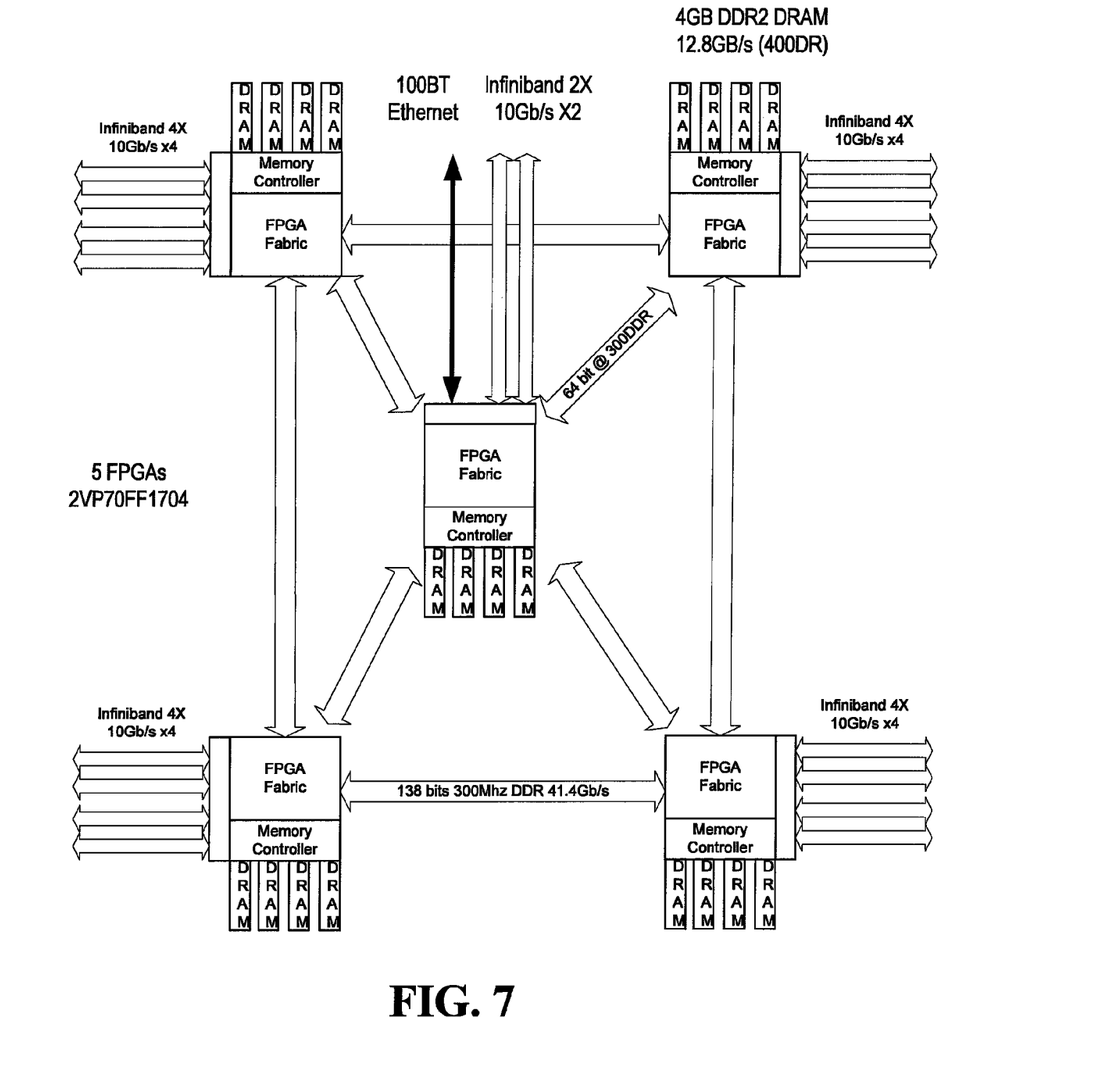
FIG. 7 depicts a Berkeley Emulation Engine 2 (BEE2) computational module having five Field Programmable Gate Array (FPGA) chips, consistent with an embodiment of the present invention.

In an experimental implementation a Berkeley Emulation Engine 2 (BEE2) multi-FPGA system was used to test a specific design. The basic BEE2 compute module (FIG. 7) consists of five Xilinx Virtex 2 Pro 70 FPGA chips. Each of the chips was directly connected to four DDR2 240-pin DRAM DIMMs, with a maximum capacity of 4 GB per FPGA chip. The four DIMMs running at 200 MHz (400DDR), were organized into four independent DRAM channels with a 72-bit data interface. Therefore, peak aggregate memory bandwidth was 12.8 GBps per FPGA chip. The FPGAs were laid out in a star topology with four user FPGAs and one control FPGA. The control FPGA was connected to each of the user FPGAs. The control FPGA ran a modified version of Linux and managed the programming of the user FPGAs as well as provided some debug and test modules through the Berkeley OS for Re-Programmable Hardware (BORPH). For further details on BORPH reference can be made to H. K.-H. So. Borph, *An operating system for fpga-based reconfigurable computers*, Ph.D. dissertation, University of California, Berkeley, which is fully incorporated herein by reference.

The performance of the design on BEE2 was compared to a software implementation on a general purpose processor in two examples. Dual 3 GHz Xeon Ubuntu processors were used as the general purpose processor with 2 GB of RAM. In order to have a fair comparison between the software and hardware performances, the same techniques were used in both hardware and software implementations, such as bit-level encodings, parent set discovery, and calculating the local scores in the preprocessing step. A 32 bit fixed point implementation was used for the encoding of the values in the hardware implementations. Also, the hardware designs were all operational at 100 MHz. The communication between the FPGAs or the DRAM and the GPP happens through BORHP's virtual file system. BORPH infrastructure consumed 1% of total LUTs, 2% of total Flip Flops and 32 BRAMs of one FPGA chip. Also, the communication between the control FPGA and the user FPGAs happened at a 2.5 GBps rate.

The study of Signal Transduction Networks (STN) is one of the major subjects of interest in Systems Biology. Signal transduction pathways are means of regulating numerous cellular functions in response to changes in the cell's chemical or physical environment. Signal transduction often involves a sequence of biochemical reactions inside the cell, which are carried out by proteins. The network of interacting proteins relays information and the target proteins have important effects on the cell behavior. A Bayesian network learning approach to this problem is possible by reconstructing the STN among 11 proteins involved in human T-cell. For further details reference can be made to K. Sachs, O. Perez et al.,

*Causal protein-signaling networks derived from multiparameter single-cell data*, Science, 308(5721):523-529, 2005, which is fully incorporated herein by reference. The Parallel Tempering algorithm was tested on data that included 5400 discrete data points. The true structure of this STN is not known and by sampling one can learn the confidence level to associate with different features of the graph such as existence of an edge between two particular variables. Since the network has a small size a supervised learning was not used to limit the candidate parent sets in this example, and instead all possible parent sets up to size 4 (562 candidate parent sets) were listed. Based on the synthesis results in Table 2 one MCMC core is bounded by the number of LUTs available on one Xilinx Virtex II Pro chip. Hence 6 MCMC cores fit on a chip and a total of 24 cores on one BEE2 module (using each of the four user FPGAs). The performance results are shown in Table 5 that demonstrate an increase in the processing speed by a factor greater than four orders of magnitude compared to the performance on a relatively fast GPP.

TABLE 2

Synthesis Results for Signal Transduction Network with 11 nodes on Xilinx Virtex II Pro 70 FPGA.

| Module | Number of LUT4 | Number of Flipflops | Number of BRAMs |
|---|---|---|---|
| 1 node | 714 | 118 | 3 |
| 11 nodes | 7854 | 1298 | 33 |
| MCMC* | 1658 | 2493 | 3 |
| 1 MCMC core | 9512 = 14% | 3791 = 5% | 36 = 12% |

MCMC* refers to all the statemachines, look-up tables and random number generators needed to realize MCMC algorithm on FPGA.

Figure 8:
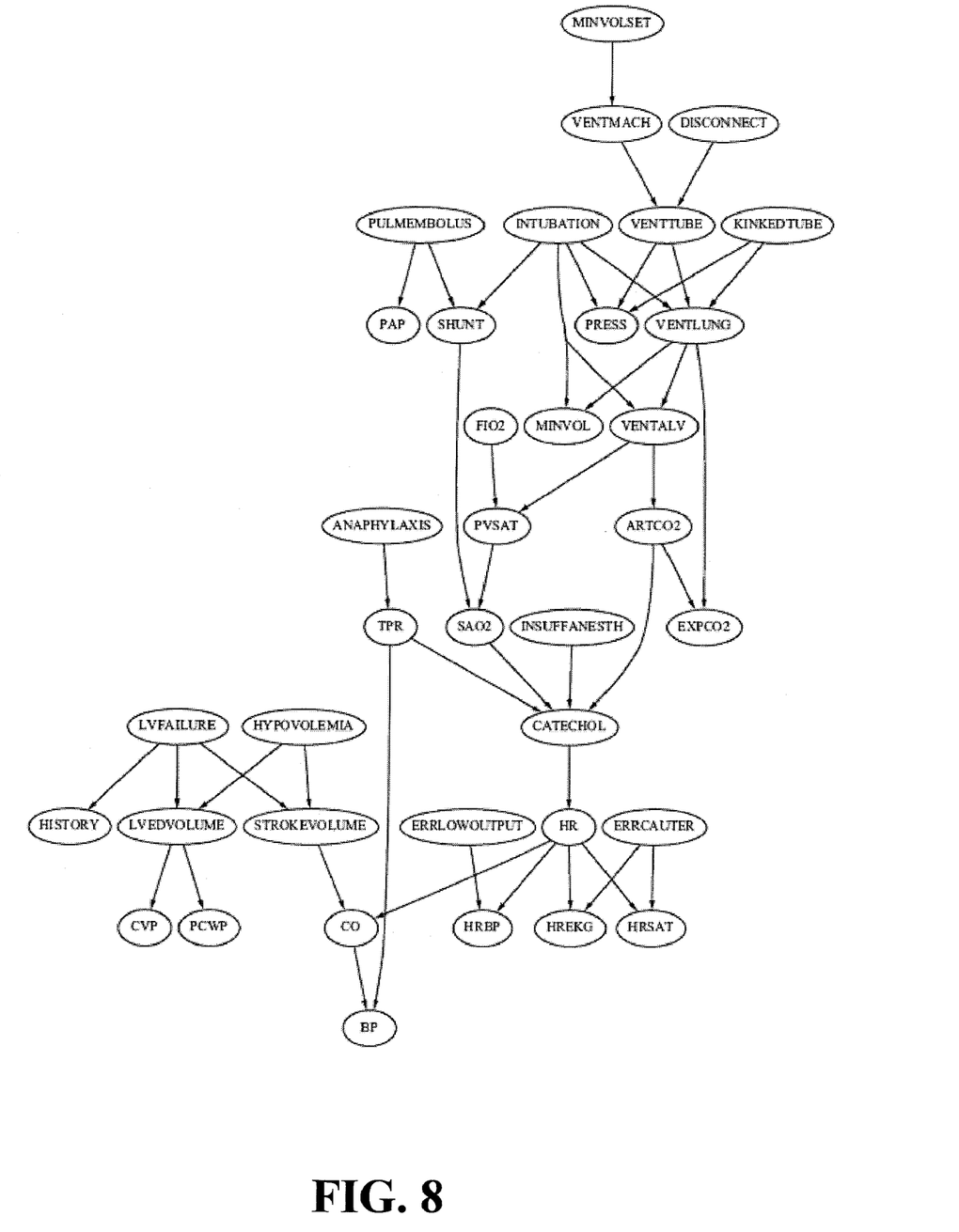
FIG. 8 depicts an ALARM network, consistent with an embodiment of the present invention.

In order to verify the algorithm and design for larger size problems, the method disclosed herein was applied to the ALARM network. ALARM is a standard discrete Bayesian network with 37 variables and is widely used to compare and test Bayesian learning algorithms. The structure and parameters of the network are chosen from the Bayesian network repository. The ALARM network is depicted in FIG. 8. In this example considering all possible parent sets up to size K for K>2 would result in a very slow performance (based on software simulations). Moreover, the parent set and the local scores databases would no longer fit in on-chip memory for the hardware implementation. Therefore, the supervised learning methods were applied to learn the promising candidate parent sets in the pre-processing step and to restrict the search space before running the MCMC algorithm in order space. The MART algorithm was applied on the ALARM network with different data sizes. As can be seen in Table 4, MART could correctly recover most of the true parent sets with different data sizes. It is also successful for cases with incomplete data where we have partial observations at each data point. By picking the first k predicted neighbors as parent set candidates the number of parent sets for each node was reduced from $$\sum_{k=0}^{K} \binom{n}{k} \text{ to } 2^k.$$

A moderate number of false positives can be tolerated since sampling was done with the subsets of the candidate sets rather than relying only on the sets. The data of size 18.5 k was used and possible parent sets up to size 4 were listed from the neighborhood of size 7 discovered by MART. This can be useful for decreasing the number of possible parent sets from 74,519 (listing all possible parent sets up to size 4) to 99. In several runs of the algorithm it was observed that the true order is discovered by parallel tempering in less than 10,000 iterations of MCMC and the true graph is reconstructed with just one missing edge that turned out to encode a weak dependence. The synthesis result is shown in Table 3. The performance result is shown in Table 6. The software/hardware co-design approach can achieve a speed-up factor greater than four orders of magnitude in this example.

TABLE 3

Synthesis Results for ALARM Network with 37 nodes on Xilinx Virtex II Pro 70 FPGA.

| Module | Number of LUT4 | Number of Flipflops | Number of BRAMs |
|---|---|---|---|
| 1 node | 726 | 115 | 2 |
| 37 nodes | 26862 | 4255 | 74 |
| MCMC* | 1741 | 7110 | 3 |
| 1 MCMC core | 31603 = 47% | 11395 = 17% | 77 = 25% |

TABLE 4

MART results on ALARM Network.

| Data Points | % Missing Data | % PS Learned | k |
|---|---|---|---|
| 370 | 0 | 82 | 8 |
| 5550 | 0 | 96 | 6 |
| 18500 | 0 | 100 | 7 |
| 74k | 20 | 96 | 7 |
| 74k | 50 | 91 | 10 |

% PS stands for the percentage of true parent sets that are included in the neighborhoods discovered by MART assuming k is the maximum size of neighborhood through the network. % Missing Data means how many of the variables are randomly missing in each observation.

TABLE 5

Performance results for MCMC in order space for the 11 node network.

| Network Size | #MCMC cores per Chip | Clock | OPS on GPP | OPS per MCMC Core | OPS on BEE2 | Speedup | Speedup per Chip |
|---|---|---|---|---|---|---|---|
| 11 | 6 | 100 MHz | 40 | 59,417 | 1,426,008 | 35,651 | 17,825 |

OPS: Order Per Second how many orders can be scored in a second.

Dual 3 GHz Xeon Ubuntu processors with 2 GB of RAM w used as the GPP. Speedup per chip is calculated by multiplying the overall speedup by 2/4.

TABLE 6

Performance results for MCMC in order space for the 37 node network.

| Network Size | #MCMC cores per Chip | Clock | OPS on GPP | OPS per MCMC Core | OPS on BEE2 | Speedup | Speedup per Chip |
|---|---|---|---|---|---|---|---|
| 37 | 2 | 100 MHz | 120 | 336,700 | 2,693,600 | 22,447 | 11,223 |

Aspects of the present invention relate to a design that provides a full-system prototype of a scalable Bayesian network learning algorithm with hardware support. Through a software/hardware co-design approach to learning, Bayesian learning and Markov Chain Monte Carlo sampling can be combined with supervised learning methods in a parallel design on reconfigurable hardware to develop a scalable structure learning algorithm. The present invention can be particularly useful for increasing the efficiency and/or speed of the processing. For instance, when mapped on the BEE2 multi-FPGA board, operating at 100 MHz, one implementation was shown to achieve a speed up factor greater than four orders of magnitude when compared to software implementations. Sources of speedup break down to parallel implementation of scoring logic for each node as well as parallel MCMC cores to realize parallel tempering algorithm, bit level encoding of the variables, fixed point calculation and most important of all low level implementation of computations.

Aspects of the invention allow for a reconfigurable computing approach to develop Bayesian network structure learning algorithms and provide a framework for applying Bayesian network learning to complex real life problems.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, such changes may include various configurable hardware and software combinations including circuits other than FPGAs and those circuits and devices listed herein. Other changes include implementing aspects of the invention with teachings disclosed in the Appendix from the underlying provisional application and/or those teachings in the incorporated references. Such modifications and changes do not depart from the true spirit and scope of the present invention, which is set forth in the following appended claims.

What is claimed is:

1. A system for computations to learn the relationships and patterns in a set of observed objects, the system comprising:
    circuitry configured to
        implement parallel and sequential implementation versions of an algorithm for search and sampling of structures; and
        perform two dimensional encoding of ordering between the variables to facilitate efficient computations, fixed point representation of values for efficient computation.

2. The system of claim 1, wherein the circuitry includes a processor and a tangible recordable medium storing instructions that when executed by the processor result in the implementation of the parallel and sequential implementation versions of an algorithm for search and sampling of structures and the performance of two dimensional encoding of ordering between the variables to facilitate efficient computations, fixed point representation of values for efficient computation.

3. The system of claim 1, wherein the circuitry includes hardware configured and arranged to implement the parallel and sequential implementation versions of an algorithm for search and sampling of structures; and to perform two dimensional encoding of ordering between the variables to facilitate efficient computations, fixed point representation of values for efficient computation.

4. The system of claim 1, wherein the circuitry is further configured to
    generate local scores for each object and possible parent sets of that object, wherein the local scores are indicative of the strength of the relationship between each object and a parent set; and
    sample structures derived from the generated local scores for each object to assess and, indicating therefrom, a Bayesian-based relationship.

5. A circuit-implemented method to identify at least one pattern, or relationship, of objects in a set of objects, the method comprising:
    pre-processing the set of objects by
        operating a logic circuit to generate local scores for each object and possible parent sets of that object, wherein the local scores are indicative of the strength of the relationship between each object and a parent set, and
        storing the local scores and the possible parent sets in a memory circuit that is configured and arranged to provide, for each of the data nodes, access to each of the possible parent sets and the local scores;
    after pre-processing the set of objects, while accessing the stored local scores and possible parent sets, using a state-machine circuit to perform sampling and searching of the parent sets for each data node, including
        using the local scores to encode possible orderings of the parent sets,
        executing an algorithm, that uses the encoded possible orderings and a random variable, for generating and scoring a current order and a proposed order of the possible parent sets, and
        choosing to accept or reject the proposed orders based on a set of probability rules applied to the scores for the current and proposed orders; and
    sampling structures derived from the accepted proposed orders to assess and, indicating therefrom, a Bayesian-based relationship.

6. The method of claim 5, wherein the step of pre-processing further includes the step of concurrently operating similarly-constructed logic circuits, respectively, to generate local scores of possible parent sets for each of the objects.

7. The method of claim 6, wherein the similarly-constructed logic circuits are FPGA-based circuits.

8. The method of claim 5, wherein the step of pre-processing is performed only once for the step of sampling structures from the accepted proposed orders.

9. The method of claim 5, wherein the algorithm is a based on MCMC sampling algorithm and wherein executing the algorithm includes learning orders in response to choosing to accept or reject the proposed orders.

10. The method of claim 9, wherein the set of probability rules includes rules indicating that a chain of the proposed orders, subjected to the algorithm, will tend to converge to a posterior probability in steady state.

11. The method of claim 5, wherein the state-machine circuit is operated to randomly walk through possible orders.

12. The method of claim 11, wherein the step of using the state-machine circuit to walk through possible orders includes applying a random change to previously-encoded possible orderings of the parent sets.

13. The method of claim 5, further including two dimensional encoding of ordering between the variables to permit more efficient computations, fixed point representation of values for efficient computation.

14. A system to identify at least one pattern, or relationship, of data nodes in a set of data nodes, the system comprising:
a pre-processing logic circuit configured and arranged to
generate local scores for each object and possible parent sets of that object, wherein the local scores are indicative of the strength the relationship between each object and a parent set, and
store the local scores and the possible parent sets in a memory circuit that is configured and arranged to provide, for each of the data nodes, access to each of the possible parent sets and the local scores;
a state-machine circuit configured and arranged to, after pre-processing the set of objects and while accessing the stored local scores and possible parent sets, perform sampling and searching of the parent sets for each data node including
using the local scores to encode possible orderings of the parent sets,
executing an algorithm, that uses the encoded possible orderings and a random variable, for generating and scoring a current order and a proposed order of the possible parent sets, and
choosing to accept or reject the proposed orders based on a set of probability rules applied to the scores for the current and proposed orders; and
a processing circuit configured and arranged to sample structures derived from the accepted proposed orders to assess and, indicating therefrom, a Bayesian-based relationship.

15. The system of claim 14, wherein the pre-processing logic circuit is further configured to concurrently operate similarly-constructed logic circuits, respectively, and to generate local scores of possible parent sets for each of the objects.

16. The system of claim 15, wherein the similarly-constructed logic circuits are FPGA-based circuits.

17. The system of claim 14, wherein the pre-processing logic circuit is further configured to performed the pre-processing steps only once for the step of sampling structures from the accepted proposed orders.

18. The system of claim 14, wherein the algorithm is a based on MCMC sampling algorithm and wherein executing the algorithm includes learning orders in response to choosing to accept or reject the proposed orders.

19. The system of claim 14, wherein the set of probability rules includes rules indicating that a chain of the proposed orders, subjected to the algorithm, will tend to converge to a posterior probability in steady state.

20. The system of claim 14, wherein the state-machine circuit is operated to randomly walk through possible orders.

21. The system of claim 20, wherein using the state-machine circuit to walk through possible orders includes applying a random change to previously-encoded possible orderings of the parent sets.

22. The system of claim 14, wherein the system is further configured to implement two dimensional encoding of ordering between the variables in a manner that provides efficient computations and fixed point representation of values for efficient computation.

* * * * *